United States Patent
Hamzeh

(10) Patent No.: US 12,115,536 B2
(45) Date of Patent: Oct. 15, 2024

(54) FLUID-BORNE PARTICLE CLASSIFICATION SYSTEM AND METHOD OF USE

(71) Applicant: IRON ORE COMPANY OF CANADA, Montréal (CA)

(72) Inventor: Nijad Hamzeh, Labrador City (CA)

(73) Assignee: IRON ORE COMPANY OF CANADA, Montreal (CA)

( * ) Notice: Subject to any disclaimer, the term of this patent is extended or adjusted under 35 U.S.C. 154(b) by 0 days.

(21) Appl. No.: 17/756,838

(22) PCT Filed: Dec. 4, 2020

(86) PCT No.: PCT/CA2020/051667
§ 371 (c)(1),
(2) Date: Jun. 3, 2022

(87) PCT Pub. No.: WO2021/108917
PCT Pub. Date: Jun. 10, 2021

(65) Prior Publication Data
US 2023/0001426 A1    Jan. 5, 2023

Related U.S. Application Data

(60) Provisional application No. 62/944,581, filed on Dec. 6, 2019.

(51) Int. Cl.
*B03B 7/00* (2006.01)
*B01D 21/00* (2006.01)
(Continued)

(52) U.S. Cl.
CPC ............ *B03B 7/00* (2013.01); *B01D 21/0009* (2013.01); *B01D 21/0012* (2013.01);
(Continued)

(58) Field of Classification Search
CPC .... B03B 7/00; B03B 5/34; B03B 5/66; B03B 5/623; B03B 9/00; B01D 21/0009;
(Continued)

(56) References Cited

U.S. PATENT DOCUMENTS 2,932,395 A * 4/1960 Marot ..................... B03B 5/447
209/172.5
3,677,475 A * 7/1972 Dancy ...................... B03B 9/00
241/20

(Continued)

FOREIGN PATENT DOCUMENTS

| CA | 2957257 A1 | 2/2016 |
| CA | 2959598 A1 | 3/2016 |

(Continued)

OTHER PUBLICATIONS

Govender, RD., Reflux Classification of South African Coal, Master's thesis, University of Kwa-Zulu-Natal, Durban, South Africa, retrieved online on Jan. 5, 2021 [May 1, 2021] at: https://researchspace.ukzn.ac.za/handle/10413/14887.

(Continued)

*Primary Examiner* — Gene O Crawford
*Assistant Examiner* — Muhammad Awais
(74) *Attorney, Agent, or Firm* — NORTON ROSE FULBRIGHT CANADA LLP

(57) ABSTRACT

There is provided a particle classification system comprising: a classifier including: a vat defining an interior cavity, a feeder conduit upstream of the interior cavity, an overflow conduit in fluid communication between a top of the interior cavity and outside the vat, an underflow conduit downstream of the interior cavity and a controllable underflow valve fluidly connected to a bottom of the interior cavity, the underflow valve controlled to be either in an open configuration in which the interior cavity is in fluid communication (Continued)

with the underflow conduit or in a closed configuration in which the interior cavity is sealed from the underflow conduit; a feed preparation circuit upstream of the feeder conduit; a rejection circuit downstream of the overflow conduit, and a beneficiation circuit downstream of the underflow conduit. There is also provided a method of classifying fluid-borne particles comprising obtaining a feed containing high-density particles.

21 Claims, 7 Drawing Sheets

(51) Int. Cl.
  *B01D 21/26* (2006.01)
  *B03B 5/34* (2006.01)
  *B03B 5/66* (2006.01)
(52) U.S. Cl.
  CPC .............. *B01D 21/267* (2013.01); *B03B 5/34* (2013.01); *B03B 5/66* (2013.01)
(58) Field of Classification Search
  CPC .............. B01D 21/0012; B01D 21/267; B01D 21/0045; B01D 21/0057; B01D 21/2472
  USPC ......................................................... 209/13
  See application file for complete search history.

(56) References Cited

U.S. PATENT DOCUMENTS

| | | | | |
|---|---|---|---|---|
| 3,802,632 A * | 4/1974 | Dancy | ...................... | B03D 1/02 |
| | | | | 209/729 |
| 3,905,556 A * | 9/1975 | Drage | ..................... | B02C 23/14 |
| | | | | 241/DIG. 38 |
| 3,945,575 A * | 3/1976 | Marsh | ....................... | B03B 9/06 |
| | | | | 241/DIG. 38 |
| 4,086,169 A * | 4/1978 | Skarheim | .......... | B01D 21/0063 |
| | | | | 210/519 |
| 4,295,881 A * | 10/1981 | Saville | .................... | B03D 1/02 |
| | | | | 75/10.67 |
| 4,533,464 A * | 8/1985 | Smith | ..................... | B03B 13/00 |
| | | | | 209/172.5 |
| 5,824,210 A * | 10/1998 | Kuryluk | ................... | C02F 1/36 |
| | | | | 209/159 |
| 6,264,040 B1 * | 7/2001 | Mankosa | ................ | B03B 11/00 |
| | | | | 209/172.5 |
| 6,814,241 B1 | 11/2004 | Galvin | | |
| 7,997,414 B2 * | 8/2011 | Niitti | ...................... | B03B 5/623 |
| | | | | 209/159 |
| 9,283,569 B2 | 3/2016 | Orupold | | |
| 9,415,397 B1 | 8/2016 | Christodoulou | | |
| 9,421,554 B2 * | 8/2016 | Gardiner | ................. | B03B 5/623 |
| 9,579,659 B2 * | 2/2017 | Starr | ....................... | B03B 5/623 |
| 9,968,945 B1 * | 5/2018 | Filmer | ...................... | C22B 3/04 |
| 10,052,637 B2 | 8/2018 | Mankosa et al. | | |
| 10,300,495 B2 * | 5/2019 | Galvin | .................... | B03B 11/00 |
| 2013/0313167 A1 * | 11/2013 | Vandemierden | ........ | B07B 15/00 |
| | | | | 209/214 |
| 2014/0262968 A1 * | 9/2014 | Fritz | ......................... | B03B 7/00 |
| | | | | 241/60 |
| 2015/0182973 A1 * | 7/2015 | Mankosa | .................. | B03B 5/28 |
| | | | | 209/12.1 |
| 2016/0214116 A1 * | 7/2016 | Christodoulou | .......... | B03B 5/66 |
| 2018/0036803 A1 * | 2/2018 | Yamamoto | ............... | B22F 9/04 |
| 2018/0111131 A1 * | 4/2018 | Filmer | ..................... | B03D 1/10 |
| 2018/0257087 A1 * | 9/2018 | Ivanoff | ..................... | B03B 9/00 |
| 2019/0351429 A1 * | 11/2019 | Ivanoff | ................ | B01D 21/267 |

FOREIGN PATENT DOCUMENTS

| | | | | | |
|---|---|---|---|---|---|
| CN | 107344140 | A | * | 11/2017 | |
| CN | 108993763 | A | * | 12/2018 | .............. B03B 7/00 |
| CN | 109499747 | A | * | 3/2019 | |
| FR | 2550103 | A1 | * | 2/1985 | |
| GB | 1332121 | | * | 7/1969 | |
| GB | 1332121 | A | | 10/1973 | |
| GB | 2092466 | A | * | 8/1982 | ............. B01F 15/02 |
| WO | WO-2015106871 | A1 | * | 7/2015 | ............. B03C 1/002 |
| WO | 2015168743 | A2 | | 11/2015 | |
| WO | 2018039146 | A1 | | 3/2018 | |
| WO | WO-2019207492 | A1 | * | 10/2019 | .............. B03B 5/34 |

OTHER PUBLICATIONS

Gleason, D., The fine print in FLSmidth's REFLUX Classifier technology, Internet post to International Mining, posted Jan. 14, 2019 (Jan. 14, 2019), retrieved from the internet at https://im-mining.com/2019/01/14/fine-print-flsmidths-reflux-classifier-technology/ on Oct. 29, 2021 (Oct. 29, 2021).

Youtube video titled: "FLSmidth REFLUX® Classifier", posted to Youtube on Jul. 24, 2015 (Jul. 24, 2015) at https://www.youtube.com/watch?v=eugS t85 E8, retrieved from the internet on Oct. 29, 2021 (Oct. 29, 2021).

"Modular RCs for chromite tailings beneficiation", MechChem Africa, pp. 20-21, Nov. 14, 2017, retrieved as pdf from internet at https://www.crown.co.za/latest-news/mechchem-africa-latest-news/5742-modular-rcs-for-chromite-tailings-beneficiation on Mar. 21, 2022 (Mar. 21, 2022).

\* cited by examiner

FLUID-BORNE PARTICLE CLASSIFICATION SYSTEM AND METHOD OF USE

TECHNICAL FIELD

The application relates generally to particle classification technologies and, more particularly, to particle classification systems including fluid-borne particle classification devices and to methods of using same.

BACKGROUND OF THE ART

One of the challenges faced by the iron ore industry relates to the beneficiation of fine iron ore, i.e., an output of ore processing plants that typically goes to waste. Indeed, such tailings typically consist of a slurry of mostly undesirable particles, and yet contain some that have highly-sought physical characteristics, whether chemical, crystalline, mechanical, optical, or others, and therefore hold non-negligible residual economic value. Techniques conventionally used for discriminating particles contained in tailings have different degrees of effectiveness, some techniques having shortcomings that become more apparent in certain industrial applications, such as for the recovery of fine iron particles from the tailings of large-scale iron ore extraction and beneficiation. For instance, equipment relying on centrifugal separation principles (e.g., spiral concentrators) have been widely used in high-volume operations, although with limited economic benefits due to inherent limitations affecting their effectiveness in recovering fine, yet high-value particles present in substantial amounts in certain ore feeds. Relatively recent particle classification technologies leveraging fluidized bed separation and lamella settling principles (e.g., reflux classifiers) have also exhibited limitations when operated at industrial-level throughputs and particularly when used to classify ore feeds containing a high proportion of fine particles. Hence, improvements in this field are desirable.

SUMMARY

According to one aspect of the present technology, there is provided a particle classification system comprising: a classifier including: a vat defining an interior cavity, a feeder conduit upstream of the interior cavity, an overflow conduit in fluid communication between a top of the interior cavity and outside the vat, an underflow conduit downstream of the interior cavity and a controllable underflow valve fluidly connected to a bottom of the interior cavity, the underflow valve controlled to be either in an open configuration in which the interior cavity is in fluid communication with the underflow conduit or in a closed configuration in which the interior cavity is sealed from the underflow conduit; a feed preparation circuit upstream of the feeder conduit; a rejection circuit downstream of the overflow conduit, and a beneficiation circuit downstream of the underflow conduit.

In some embodiments, the feed preparation circuit includes a plurality of separation devices, each one of the plurality of separation devices having a preparation outlet serially arranged upstream of the classifier and a rejection outlet routed away from the classifier.

In some embodiments, the plurality of separation devices includes a screen having a fine particle outlet upstream of the classifier.

In some embodiments, the classifier is a first classifier, the system further comprising a second classifier, the screen having a coarse particle outlet separate from the fine particle outlet and upstream of the second classifier.

In some embodiments, the plurality of separation devices includes a magnetic separator upstream of the screen.

In some embodiments, the screen includes a first screen and a second screen, the fine particle outlet upstream of the first classifier being a first fine particle outlet of the first screen, the coarse particle outlet upstream of the second classifier being a first coarse particle outlet of the first screen, the second screen having a second fine particle outlet upstream of the first screen. In some such embodiments, the feed preparation circuit includes a mill having an input and an output, the second screen having a second coarse particle outlet separate from the second fine particle outlet and routed to the input of the mill, the output of the mill routed to upstream of the second screen.

In some embodiments, the plurality of separation devices includes a first cyclone downstream of the screen, a second cyclone between the magnetic separator and the screen, and a third cyclone upstream of the magnetic separator.

In another aspect of the present technology, there is provided a method of classifying fluid-borne particles comprising: obtaining a feed containing high-density particles and low-density particles; fluidizing the feed into a fluidized substance; rejecting an overflow from the fluidized substance, the overflow having a concentration of the low-density particles greater than that of a remainder of the fluidized substance; sensing a relative density value of the fluidized substance; and taking an underflow from the fluidized substance upon the sensed relative density value being indicative of the fluidized substance having a grade of the high-density particles corresponding to a threshold value.

In some embodiments, the feed has a grade of the high-density particles of at least 20% and more preferably between 30% and 43%.

In some embodiments, the method further comprises splitting a substance having a grade of the high-density particles lesser than that of the feed into a split overflow and a settled underflow according to a split value of at least 50, the feed obtained from the split overflow.

In some embodiments, the feed has a feed density lesser than 40%, and the method further comprises increasing the feed density to at least 40% and more preferably between 40% and 55%.

In some embodiments, the feed is flowed to the fluid-borne particle classification device at a feed rate of between 10 tph and 200 tph and more preferably between 100 tph and 200 tph. In one embodiment, the feed is flowed to the fluid-borne particle classification device at a feed rate of between 31 tph and 44 tph.

In some embodiments, the fluidization fluid is flowed at a fluidization flow rate of between 10 USGPM and 200 USGPM and more preferably between 80 USGPM and 100 USGPM. In one embodiment, the fluidization fluid is flowed at a fluidization flow rate of between 59 USGPM and 81 USGPM.

In some embodiments, the sensed relative density corresponding to the threshold value is between 1800 kg/m$^3$ and 3000 kg/m$^3$ and more preferably between 2000 kg/m$^3$ and 2500 kg/m$^3$. In one embodiment, the sensed relative density is of between 2183 kg/m$^3$ and 2423 kg/m$^3$.

In some embodiments, the threshold value is of at least 60%.

In some embodiments, a dry weight of the high-density particles of the underflow is at least 40% of that of the high-density particles of the feed and more preferably at least 45%.

According to yet another aspect of the present technology, there is provided a method of concentrating a substance containing fluid-borne high-density particles comprising: flowing the substance into a hindered settler; obtaining a feed from an overflow of the hindered settler, the feed having a grade of the high-density particles of at least 20%; flowing the feed into a fluid-borne particle classification device; and obtaining a concentrate from an underflow of the fluid-borne particle classification device, the concentrate having a grade of the high-density particles of at least 50%, a dry weight of the high-density particles of the concentrate being at least 45% of that of the high-density particles of the feed.

DESCRIPTION OF THE DRAWINGS

Reference is now made to the accompanying figures in which.

DETAILED DESCRIPTION

General Description of the Particle Classification System

Figure 1:
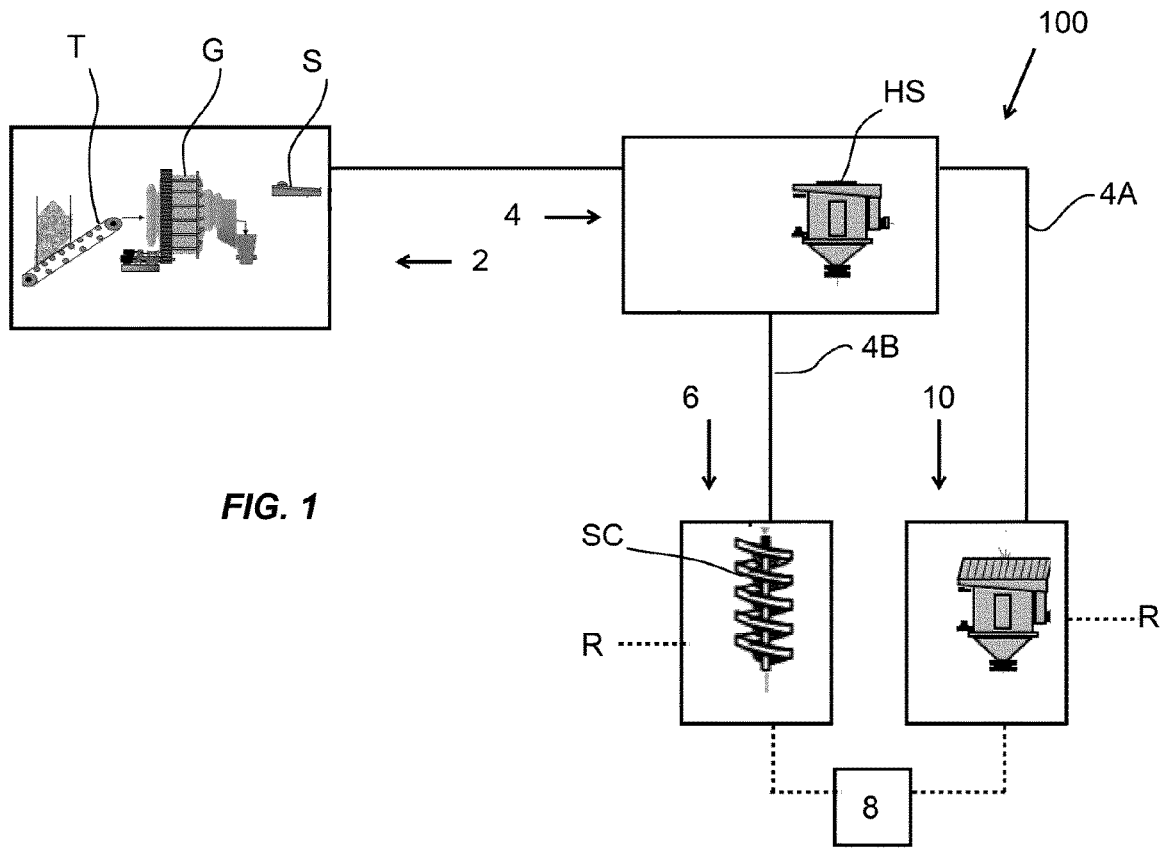
FIG. 1 is a flow chart representation of a particle classification system according to embodiments the present technology.

According to an aspect of the present technology, there is provided a particle classification system generally shown at 100 in FIG. 1. The system 100 notably comprises a fluid-borne particle classification device 10, henceforth referred to as a classifier 10 for brevity. The classifier 10 is of a type suitable for use in industrial-scale ore particle beneficiation processes and related methods. As will become apparent from the forthcoming, the classifier 10 may be used in conjunction with other devices of the system 100 and operated therewith under certain conditions so as to optimize its yield with respect to ore-specific physico-chemical constraints or economic objectives. Some of the terminology used to describe the classifier 10 pertains to such beneficiation processes or related methods. For example, it should be understood that the term "flow" may be used with respect to a substance that is movable by means of a device of the system 100, the classifier 10 for instance, regardless of the substance being a fluid substance, a solid substance or a heterogeneous substance such as a slurry, as the case may be at either step of such processes. Moreover, unless stated otherwise, whenever the terms "upstream" and "downstream" are used to qualify elements such as equipment or flow, they should be understood to indicate relative position or direction within such processes. Indeed, other devices or elements used in some implementations of such processes may be located upstream or downstream of the classifier 10 without there being direct communication therebetween, let alone direct fluid communication. For example, as schematically shown in FIG. 1, the ore, once ran out of mine, typically enters processing in what may be referred to as a grinding circuit 2, or stage, of the system 100, i.e., a circuit of equipment including machinery G such as grinders, crushers or other mill-like devices for reducing a size of the raw ore material. The grinding circuit 2 may also include transport equipment T, for example a conveyor upstream of the machinery G, and may also include sizing equipment, such as a screen S, at a downstream end of the grinding circuit 2. The ore may thus be grinded down and screened until reduced into size fractions finer than, for example, a size threshold of about 1400 μm. Downstream of the grinding circuit 2, the reduced ore reports to a portion of the system 100 referred to as a feed preparation circuit 4. The feed preparation circuit 4 includes at least one piece of particle separation equipment, i.e., a device adapted to separate a flow of mixed ore particles received thereby into at least two downstream flows, such as shown at 4A and 4B. A hindered settler, shown at HS, may in some implementations be one such separation device. It should be noted that such mixed flow comprises a wide range of size fractions of particles of both high-value minerals and low-value minerals, such that the former may be described as being in diluted form. In one exemplary case of ore deposit being the object of industrial mining, high-value iron particles may be found in multiple mineral forms, such as hematite ($Fe_2O_3$) and magnetite ($Fe_3O_4$), a significant percentage of which is present in fine size fractions of 200 μm or finer. Low-value particles, for instance silica ($SiO_2$), are also found throughout the range of size fractions. The hindered settler HS may thus be configured so as to split the mixed flow of such particles into an overflow (4A) containing ultrafine ore particles (i.e., particles having a size fraction finer than about 200 μm) from an underflow (4B) containing most of the coarser ore particles, on the basis of differences in density between the high-value and low-value particles. As iron has a density that is higher (>5 g/cm$^3$) than that of silica (<3 g/cm$^3$), large, dense iron particles are flowable downward inside the hindered settler HS to report to the underflow 4B, whereas similar sized particles of silica may be flowed upward to report to the overflow 4B. The underflow 4B reports to a coarse processing circuit 6 for further concentrating steps such as via one or more spiral concentrators SC. In either of the feed preparation 4 and coarse processing 6 stages, outputs may either report for further processing in what may be referred to as a beneficiation circuit 8, or instead be rejected as generally shown at R, to be collected as tailings which may or may not be ulteriorly be beneficiated. Further processing may in some cases include further concentration steps and/or transformation steps such as pelletizing. However, relative inefficiencies may remain as such stages, as may be observed in the hindered settler HS where coarse, light particles as well as finer, yet heavier particles are both prone to report to the overflow 4A, the latter type containing a material amount of the ultrafine, dense iron particles.

As will be described hereinbelow, in presence of a feed containing ultrafine, high-value particles diluted by low-value particles such as the abovementioned overflow 4A, the classifier 10 may allow to split the feed so as to concentrate the ultrafine high-value particles of the feed, i.e., to yield a concentrate of such particles. To wit, a grade of the concentrate, i.e., a percentage of a total dry weight of the concentrate specific to the high-value particles contained by the concentrate, is higher than that of the feed. Further, the present technology may be said to solve some of the shortcomings of conventionally implemented and conventionally used particle classification equipment. Also described as hybrids due to their combined implementation of fluidized bed separators and lamella settlers, such particle classification equipment is typically suitable for the classification of particles of minerals such as coal having a density (<2 g/cm$^3$) lesser than any of the above-mentioned minerals found in iron ore, and for size fraction distributions that do not encompass the ultrafine range that iron ore is known for.

General Description of the Classifier

Figure 2:
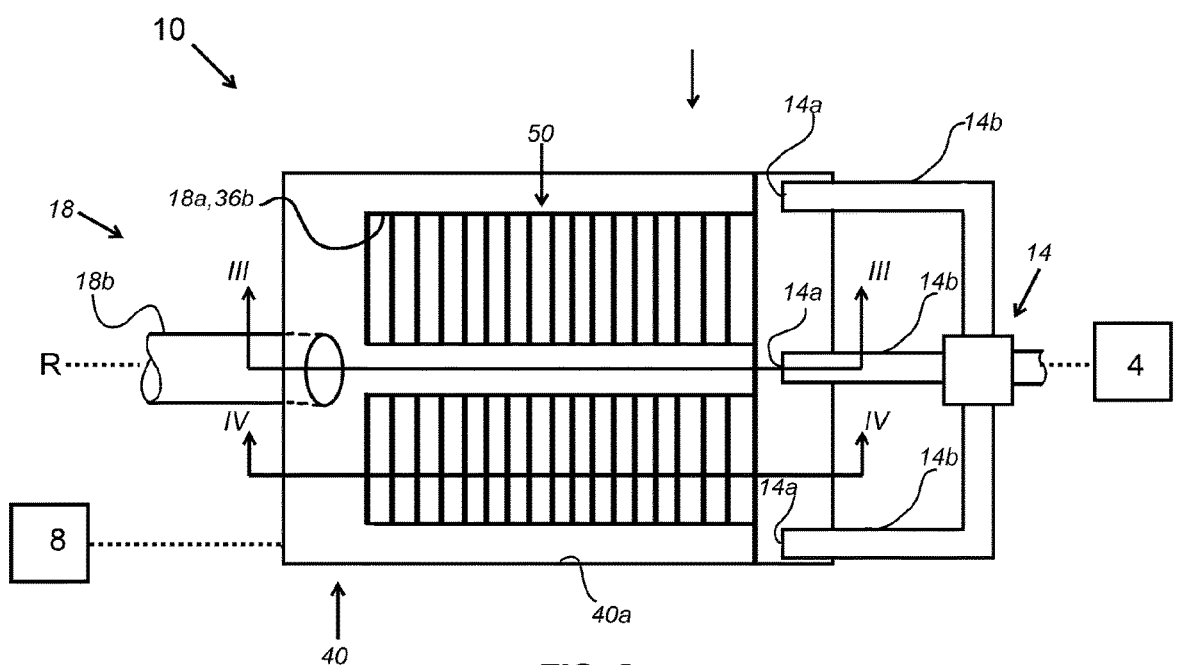
FIG. 2 is a top plan view of a fluid-borne particle classifier of the particle classification system of FIG. 1.
Figure 3:
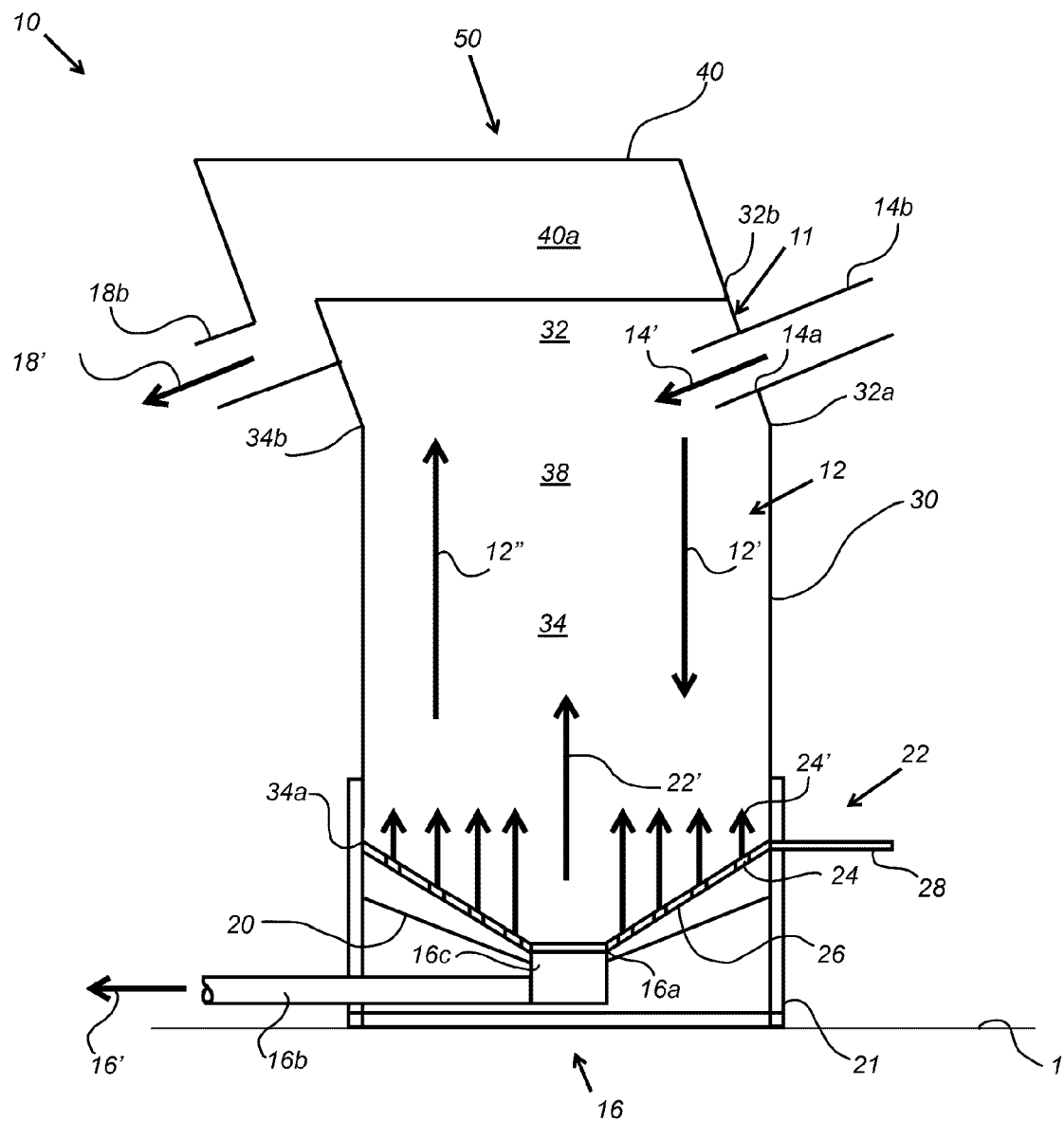
FIG. 3 is a schematic cross-sectional view of the particle classifier of FIG. 2, taken along line III-III of FIG. 2.
Figure 4:
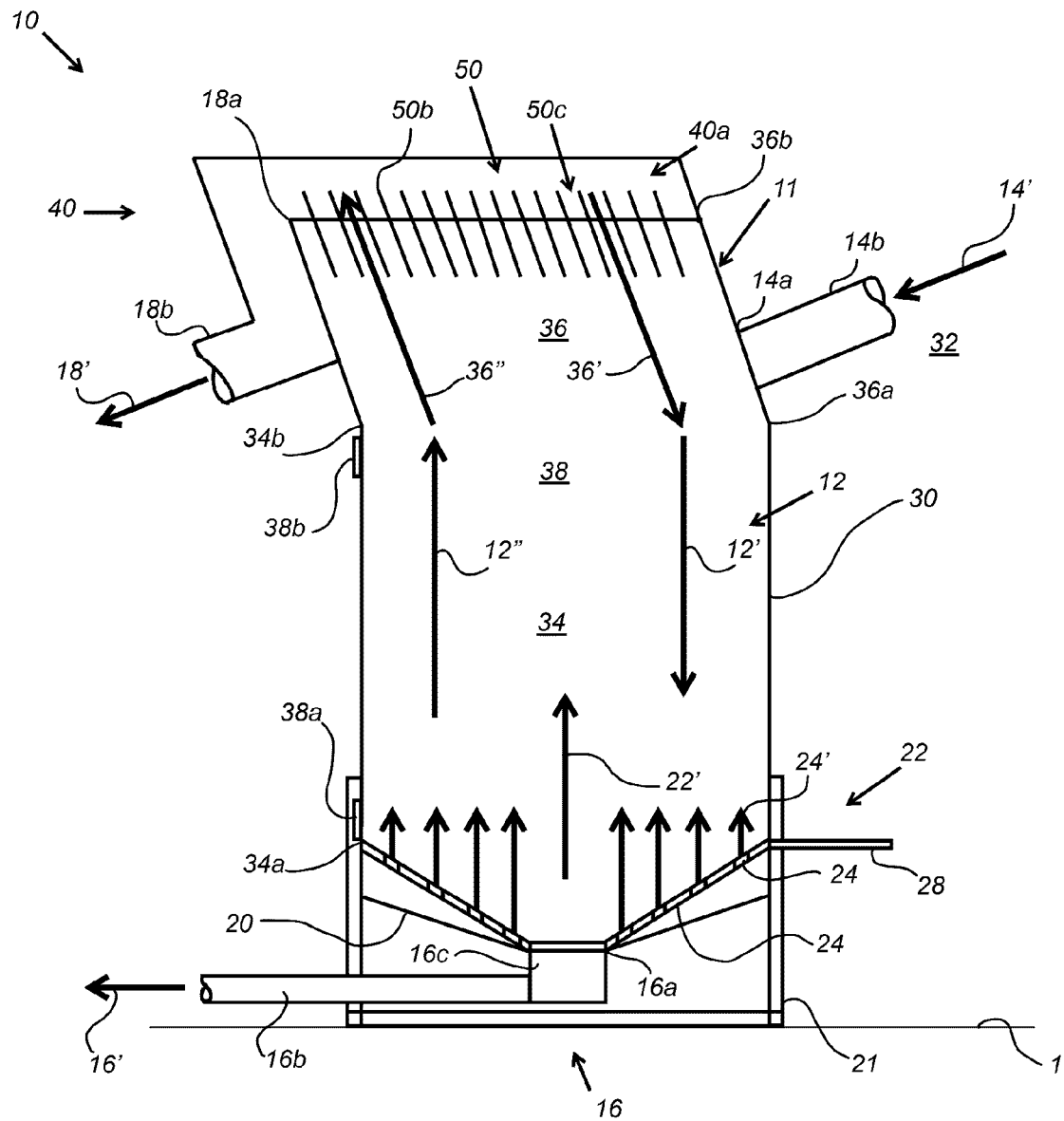
FIG. 4 is a schematic cross-sectional view of the particle classifier of FIG. 2, taken along line IV-IV of FIG. 2, and FIGS. 5 to 8 are flow chart representations of particle classification systems according to other embodiments.

With reference to FIGS. 2 to 4, structural characteristics of the classifier 10 will now be described. The classifier 10 generally includes a vat 11, an overflow launder 40 and a lamella settler 50 (FIG. 4). The vat 11 has a bottom portion forming a receptacle 20, and a second portion forming a casing 30 and extending upwardly therefrom. The receptacle 20, the casing 30 and the overflow launder 40 may be said to be stacked on top of one another, i.e., the receptacle 20 is disposed beneath the casing 30 and the overflow launder 40 is disposed onto the casing 30. The receptacle 20 and the casing 30 together define an interior cavity 12 of the vat 11, and are arranged to withstand pressure resulting from substances either flowed to and/or from the interior cavity 12 or simply contained therein. In other embodiments, the bottom and top portions of the vat 11 form an integral structure. The receptacle 20 is mounted to a base 21 of the classifier 10 arranged to support a remainder of the classifier 10 against a ground surface 1 in a generally vertical orientation. Various other means for supporting and orienting the classifier 10 are possible, such as frame-like structures that may for example be adapted for mounting the casing 30 against infrastructure typically provided in ore mining plants such as a foundation, a slab or a wall (not shown). The receptacle 20 is connected to a fluidization system 22 of the classifier 10. The fluidization system 22 is provided for selectively and controllably flowing a fluidization substance (i.e., a fluidization flow 22') inside the interior cavity 12 upwardly into the casing 30 and generally uniformly across a horizontal cross section of the casing 30. The fluidization system 22 includes a plurality of nozzles 24 arranged for flowing jets 24' of the fluidization substance so as to form the fluidization flow 22'. In this exemplary arrangement of the fluidization system 22, the nozzles 24 are supported on a funnel-like nozzle mount 26 disposed inside the interior cavity 12. At least a portion of the nozzle mount 26 narrows as it extends toward a bottom of the receptacle 20. The nozzles 24 are sized and provided on the nozzle mount 26 in a quantity and a spatial arrangement suitable for producing a generally even horizontal distribution of the fluidization flow 22' upwardly of the receptacle 20. The nozzles 24 are fluidly connected to a pressurized source (not shown) via a conduit 28 to receive the fluidized substance therefrom. The fluidization substance generally consists of a fluid, in this case water. An underflow line 16 of the classifier 10 is fluidly connected to an underflow outlet 16a of the interior cavity 12 disposed onto the receptacle 10. The underflow line 16 includes an underflow outlet conduit 16b and an underflow valve 16c disposed between the interior cavity 12 and the underflow outlet conduit 16b. The underflow outlet valve 16c is configurable via a controller (not shown) of the classifier 10 between an open configuration to open an underflow passage from inside the interior cavity 12 to outside the vat 11 to a closed configuration to close the underflow passage. The receptacle 20 and the nozzle mount 26 surround the underflow outlet 16a and may be said to be arranged to assist in directing an underflow 16' from inside the interior cavity 12 to outside the vat 11 via the underflow outlet 16a upon the underflow outlet valve 16c being in the open position. The underflow outlet valve 16c may be of a type suitable for achieving a tight seal despite the fluid flowing therethrough containing solid particles. For example, the type commonly referred to as a "pinch valve" may be used, as its inherent characteristics render it particularly effective for sealing around dense, solid particles such as iron ore particles, while being less prone to failure associated with gate valves or other like types based on rigid barrier movable between discrete positions in and out of a flow path.

A feeder line 14 of the classifier 10 is fluidly connected to a feed inlet 14a of the interior cavity 12 disposed onto the casing 30 at a location spaced upwardly from the reservoir 20. The feeder line 14 is arranged for flowing feed, i.e., a slurry containing fluid-borne particles, into the interior cavity 12. A feed flow 14' is received by the feeder line 14 from a feeding apparatus (e.g., a feed pump box, not shown) upstream therefrom. As best seen in FIG. 2, this exemplary arrangement of the feeder line 14 is a manifold of three feeder conduits 14b that connect to the casing 30 via three feed inlets 14a. The feeder line 14 is arranged for preventing backflow, i.e., for preventing substances from flowing from inside the interior cavity 12 to inside the feeder line 14. The feeder line 14 may otherwise be provided with a valve (not shown) for selectively closing the feeder line 14. Each feeder conduit 14b extends through a corresponding feed inlet 14a to inside the interior cavity 12, although it does not have to be the case. In other arrangements, the feeder line 14 may instead end flush with the casing 30. In some arrangements, the feeder line 14 may have more or less than three feeder conduits 14b connecting to the casing 30 via a corresponding amount of feed inlets 14a. The feeder line 14 connects to the casing 30 at a portion thereof forming a feed chamber 32. This exemplary arrangement of the casing 30 has distinct feed chambers 32 respectively fluidly connected to each one of the feeder conduits 14b. Each feed chamber 32 is confined along its periphery, other than for the feed inlet 14a disposed on one of its sides, and is open along its bottom end 32a so as to be in fluid communication with the reservoir 20 beneath the casing 30. Each feed chamber 32 is also confined across its top end 32b. Indeed, the top end 32b of the feed chamber 32 defines a partition between the casing 30 and the overflow launder 40. Stated otherwise, the feed chamber 32 is sealed with respect to the overflow launder 40. The casing 30 defines a mixing chamber 34 extending from the feed chamber 32 to the reservoir 20 and arranged for providing fluid communication therebetween. The mixing chamber 34 is confined along its periphery, and open both at its bottom end 34a adjacent the reservoir 20 and at its top end 34b adjacent the feed chambers 32.

Turning now to FIG. 4, the casing 30 also has overflow chambers 36 disposed alongside the feed chambers 32. In this case, two overflow chambers 36 are provided, each one disposed between two consecutive feed chambers 32. Each overflow chamber 36 is confined along its periphery, and is open across both its top 36a and bottom end 36b so as to be in fluid communication between the overflow launder 40 and the reservoir 20 beneath the casing 30. The bottom 36a and top 36b end of each overflow chamber 36 are respectively adjacent the top end 34b of the mixing chamber 34 and the overflow launder 40, respectively. The top end 36b of each overflow chamber 36 defines an overflow outlet 18a of the vat 11. The overflow launder 40 is disposed downstream of the overflow outlet 18a and arranged for flowing an overflow 18' received from the overflow outlet 18a to an overflow outlet conduit 18b of the classifier 10. The overflow launder 40 may be described as a container arranged for draining flowable substances received thereby. The overflow launder 40 defines channels 40a (best seen in FIG. 2) in fluid communication between the overflow outlet 18*a* and the overflow outlet conduit 18*b*. The channels 40*a* are arranged such that an overflow 18' received thereby from the casing 30 via the lamellar settler 50 reports to the overflow outlet conduit 18*b*, in this case gravitationally.

The lamella settler 50 includes at least one array of plates 50*b* spaced from one another and received by the interior cavity 12 so as to be enclosed by the casing 30. In this case, two arrays of plates 50*b* are provided, one being received inward each overflow outlet 18*a* so as to be enclosed by a corresponding one of the overflow chambers 36. The plates 50*b* are disposed at an inclined angle to at least one of a vertical axis about which the mixing chamber 34 is disposed. The plates 50*b* define passages between consecutive plates 50*b* and between the plates 50*b* and the periphery of the overflow chamber 36, the passages together defining an overflow conduit 50*c*. Each passage, and hence the overflow conduit 50*c*, is in fluid communication between the interior cavity 12, and hence the feed inlet 14*a* and the underflow outlet 16*a*, and inside the overflow launder 40. In this implementation of the classifier 10, the mixing chamber 34 extends upright from the reservoir 20 and a remainder of the casing 30 (i.e., a portion of the casing 30 having the feed and overflow chambers 32, 36) is at the inclined angle. Each array of plates 50*b* extends from inside its corresponding chamber inside the casing 30, to inside the overflow launder 40 outside the casing 30. It is contemplated that in other possible implementations of the classifier 10, solely an upper portion of the overflow chambers 36 located upward of the feed chambers 32 may be at the inclined angle, the feed chambers 32 and a remainder of the overflow chambers 36 extending vertically instead. In yet other possible implementations, the casing 30 may be arranged with an overflow chamber fitted with an array of plates so as to form a lamella settler having the overflow outlet conduit, the overflow chamber disposed on top of a feed chamber in fluid communication therewith.

In view of the foregoing structural characteristics, operational characteristics of the classifier 10 will now be described. Still referring to FIG. 4, the feed flow 14' may enter the interior cavity 12 via the feed inlet 14*a*. From the feed chamber 32, the feed may gravitationally flow into the mixing chamber 34 and toward the reservoir 20, thereby forming a gravitational flow 12' (i.e., a downward flow). In the mixing chamber 34, the feed may mix with the fluidization substance as fluidization flow 22' enters the mixing chamber 34. Upon the interior cavity 12 having been filled with feed and fluidisation substances up to a level overflowing from the reservoir 20 into the mixing chamber 34, the fluidization flow 22' may oppose the gravitational flow 12' such that downward movement of at least some particles (e.g., high-density particles) of the gravitational flow 12' is merely hindered and eventually pool into the reservoir 20, whereas upward movement is induced to other particles so as to form a forced flow 12" (i.e., an upward flow). As the feed may contain relatively coarse particle that combine particles of various densities, the forced flow 12" may also desirably liberate ultrafine, high-density particles, allowing them to report to the gravitational flow 12' instead and eventually pool into the reservoir 20. Further, upon the interior cavity 12 having been filled with feed and fluidisation substances up to a level overflowing to the overflow launder 40, the forced flow 12" may induce a flow of fluid-borne particles upward inside the overflow chamber 36 and inside the overflow conduit 50*c*. The abovementioned characteristics of the lamellar settler 50 are arranged such that laminar flow conditions may prevail inside the overflow conduit 50*c* and its passages. Under such conditions, particles of different sizes are respectively elutriated at the same hydraulic velocity. For instance, inside the passages, particles having higher density and/or specific gravity higher than that of their surroundings tend to settle against the plate 50*b* beneath thereof and slide downwardly therealong. Hence, under certain conditions, the ultrafine, heavy particles may report to the receptacle 20, whereas only the coarse, light particles may report to the overflow launder 40. The flows to which the ultrafine, heavy particles and the coarse, light particles respectively report may be described as a gravitational elutriated flow 36' and a forced elutriated flow 36". It will be appreciated that the vat 11 is arranged such that upon the underflow outlet 16*a* and the feed inlet 14*a* being closed, the overflow conduit 50*c* forms a sole passage between inside the interior cavity 12 and outside the vat 11. Stated otherwise, the vat 11 is arranged such that under such circumstances, particles located inside the interior cavity 12 cannot flow to outside thereof so as to bypass the lamella settler 50 and thus without subjecting to its elutriation effect.

The classifier 10 is arranged such that under certain operational conditions, a media of particles may densify within a horizontal layer of the interior cavity 12 so as to form what may be called a bed 38. The bed 38 may for instance form inside the mixing chamber 34 proximate the feed inlet 14*a*. The bed 38 may include particles having a mean density greater and/or a mean size fraction finer than that of substances elsewhere in a remainder of the mixing chamber 34. In what may be described as an autogenous process, the bed 38 may desirably assist in hindering coarse light particles from reporting downward of the bed 38 via the gravitational flow 12' and instead flow from the feed inlet 14*a* to the bed 38 and then from the bed 38 toward the overflow launder 40. It will be appreciated that the classifier 10 is arranged such that the interior cavity 12 (and thus of the bed 38) is fully exposed to the fluidization flow 22' and/or to the forced flow 12". Indeed, this may desirably assist in maintaining the bed 38 in a fluidized state, i.e., a state in which particles may flow thereto and therefrom. For example, low-density particles flowing away from the receptacle 20 and toward the bed 38 via the forced flow 12" after separating from high-density particles may also eventually flow away from the bed 38 and toward the overflow chamber 36 via the forced elutriated flow 36". Also, the ultrafine high-density particles of the gravitational elutriated flow 36' flowing away from the overflow chamber 36 and toward the bed 38 may eventually flow away from the bed 38 and toward the receptacle 20. Stated otherwise, the vat 11 is arranged so as to provide direct flow paths between the receptacle 20 and the lamella settler 50. Such direct flow paths allow, for instance, the fluidizing flow 22', the forced flow 12" and the forced elutriated flow 36" to succeed one another unhindered, whether along a side of the interior cavity 12 or at its center.

As the forced elutriated flow 36" causes some of the particles contained in the interior cavity 12 having relatively low density and a relatively large size fraction to exit the interior cavity 12, a mean density and a mean size fraction of the particles remaining inside the interior cavity 12 decreases. Conversely, a density of the bed 38 may be said to increase via the same mechanism. The classifier 10 includes a means for measuring the density of the bed 38, in this case including probes 38*a*, 38*b* connected to the casing 30. The probes 38*a*, 38*b* (schematically shown in FIG. 4) are respectively disposed proximate the bottom 34*a* and top 34*b* ends of the mixing chamber 34, and are arranged for measuring a differential pressure inside the interior cavity 12, i.e., a difference between a pressure measured at the bottom end 34a beneath the bed 38 and a pressure measured at the top end 34b proximate the bed 38. Based on the measured differential pressure, a relative density value may be calculated. The relative density may be described as a ratio of the density of the media of particles forming the bed 38 and that of the media of particles located across the mixing chamber 34. A controller of the classifier 10 (not shown) is arranged for receiving a signal indicative of the measured differential pressure and for calculating the relative density. The controller is operatively connected to the underflow outlet valve 16c and arranged to configure the underflow outlet valve 16c in the open position upon the relative density attaining a given value. It should also be noted that the relative density can be related to the grade of a media of particles located beneath the mixing chamber 34. Thus, the controller may be used to open the underflow outlet valve 16c upon the relative density attaining a value indicative of a threshold value for a desired grade of the particles, so as to obtain an underflow 16' of a substance having the desired grade.

As mentioned, ore deposits including a high-density mineral of interest may combine a mineral of a lower value that happens to have a lower density. Feeds of ore obtained from such deposits may also include a vast range of size fractions for both mineral types, as may be the case for the iron and the silica found in certain iron ore deposits. For instance, a distribution of iron and silica particles that may be found in an exemplary feed obtained from such iron ore deposits is provided at Annex 1. Known conventional classification technologies have been found to be incapable of yielding concentrates attaining target grade (e.g., >60%) and target dry weight recovery (total dry weight of the feed: >20%; iron-only dry weight of the feed: >45%) values from such feeds.

The classifier 10 may be operated according to certain operating conditions (i.e., characteristics of the feed, operating parameters of the classifier 10 and synergies between) so as to yield concentrates attaining or exceeding the target grade and the target dry weight recovery values. Such operating conditions may include a grade of the feed being of at least 20% in some embodiments. In some such embodiments, the grade of the feed may be of at most 55%, for example at least 20%, and preferably within a range of 30% to 43% in some such embodiments. The operating conditions may also include a hindered settler (HS) split value representing the percentage of material that reports to the overflow 4a downstream of the hindered settler HS and to the classifier 10 as the feed. The HS split value may be greater than 50% and, in some embodiments, be between 55% and 75%. Configuring the hindered settler HS so as to increase the HS split may increase the reporting of coarser, lower grade material to the overflow 4B and may thus decrease the grade of the feed to the classifier 10. The operating conditions may also include feed density, i.e., the percentage of solid particles in the feed. The feed density may for example be adjusted upon sensing the density of a substance obtained and by adding a fluid, such as water to the substance resulting in the feed having a desired feed density. Sensing the density of the substance and adding the fluid thereto may for example be performed dynamically, i.e., via a feed box upstream of the classifier 10. Also, adjusting the feed density may also be adjusted by controlling a mass rate at which the solid particles of the feed (i.e., solids feed rate) are fed to the classifier 10. The solids feed rate value may be of between 10 tonnes per hour (tph) and 200 tph and, in some embodiments, more preferably between 100 tph and 200 tph. In an exemplary embodiment, the feed is flowed at a feed rate of between 31 tph and 44 tph. The feed density value may in some embodiments be between 30% and 55% and, in some such embodiments, preferably be between 40% and 55%. In embodiments, the feed may be obtained at a feed density value of less than 40%, and may preferably be increased to at least 40%. The parameters may also include fluidization flow rate, i.e., a rate at which a volume of the fluidization substance is flowed via the fluidization flow 24'. The fluidization flow rate value may be of between 10 US gallons per minute (USGPM) and 200 USGPM and, in some embodiments, more preferably between 80 USGPM and 100 USGPM. In an exemplary embodiment, the fluidization fluid is flowed at a fluidization flow rate of between 59 USGPM and 81 USGPM. The parameters may also include a sensed relative density of the substance inside the interior cavity 12, and may have a value of between 1800 kg/m$^3$ and 3000 kg/m$^3$ corresponding to the threshold value. In some embodiments, the relative density may be of between 2000 kg/m$^3$ and 2500 kg/m$^3$. In an exemplary embodiment, the relative density is of between 2183 kg/m$^3$ and 2423 kg/m$^3$. Values of some of the above feed characteristics and operating parameters according to some exemplary embodiments are provided at Table 2 of Annex 1.

Exemplary Embodiments of Particle Classification Systems

Referring to FIGS. 5 to 8, other exemplary embodiments of the system 100 will now be described. In embodiments such as that depicted in FIG. 5, the feed preparation circuit 4 may include separation devices such as the hindered settler HS which, as described hereinabove, can be arranged to impart a desired grade to the feed. The system 100 may also include additional separation devices, such as a hydrocyclone C. The feed preparation circuit 4 may also include a pump box (not shown) upstream of the classifier 10, for example between the overflow outlet of the hindered settler HS and the feeder line 14 of the classifier 10. The pump box may be arranged to impart a desired feed density value and a desired solids feed rate to the feed.

Figure 5:
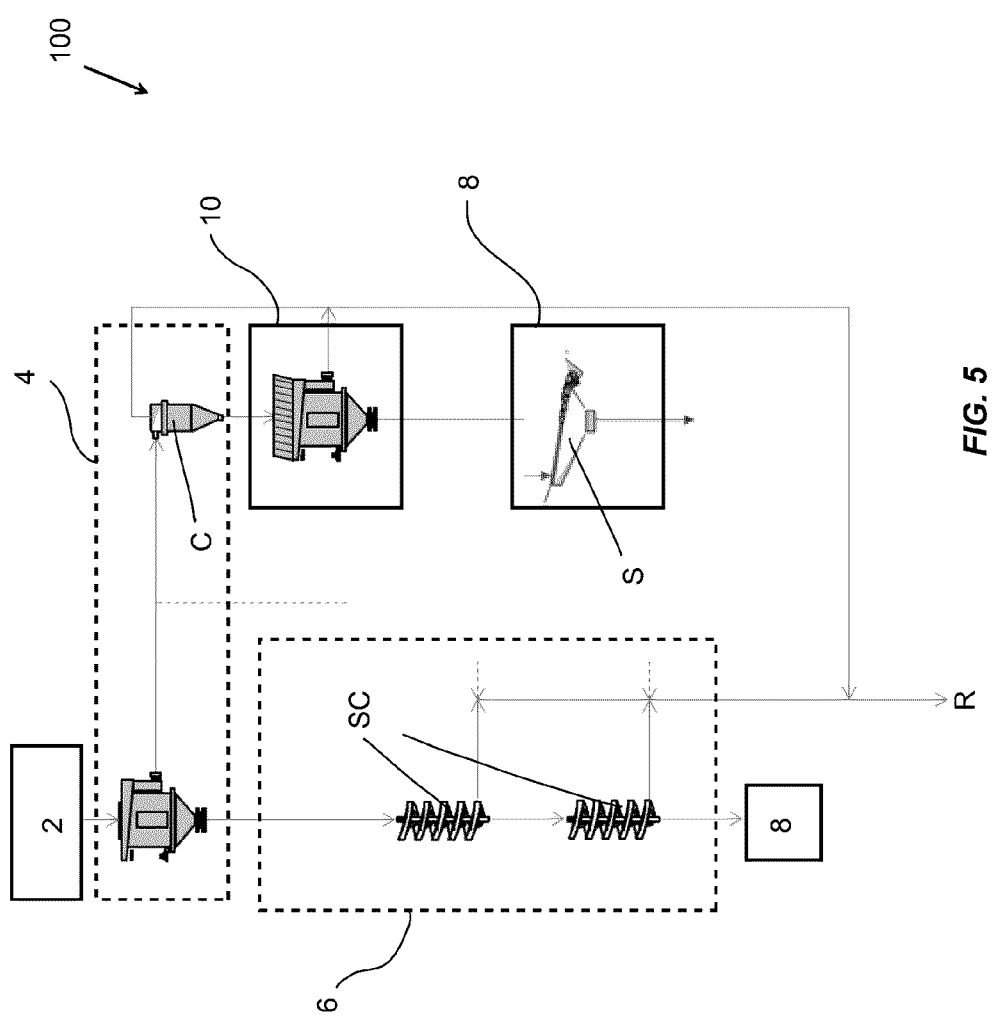

Still referring to FIG. 5, the system 100 may also include a vibrating screen S. For instance, the screen S may be provided downstream of the classifier 10 so as to screen off coarse particles from the concentrate reporting to the underflow 16', for example low-density particles combined with high-density particles, so as to increase the grade of the concentrate. The screen S may thus be said to be part of the beneficiation circuit 8 of the system 100. Furthermore, the inclusion of the screen S at this stage of the system 100 may palliate a variation in the grade of the feed, i.e., compensate an increase in coarse, low-density particles in the feed upstream of the classifier 10 by screening off some such coarse, low-density particles from the concentrate downstream of the classifier 10.

Figure 6:
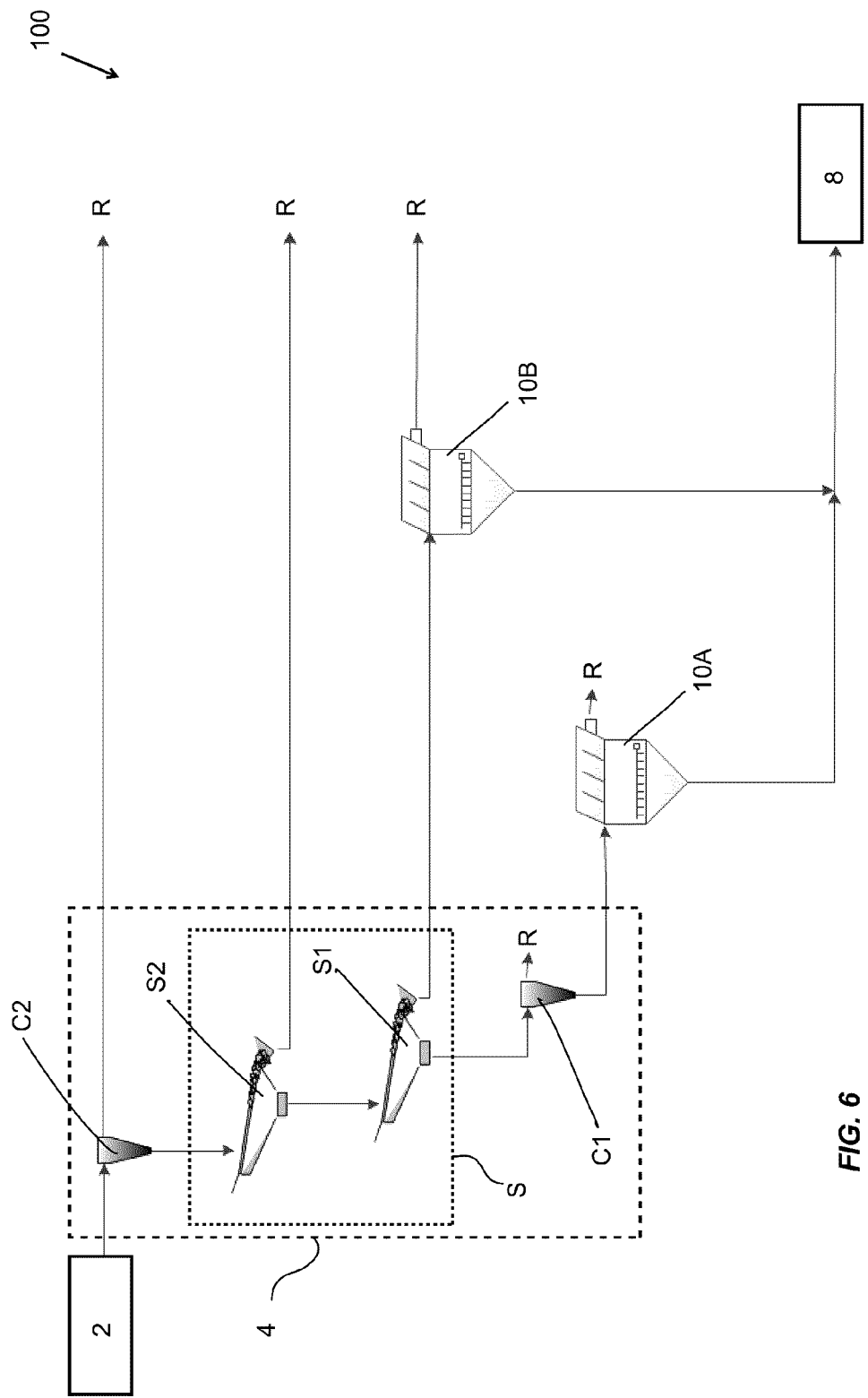

In embodiments, the system 100 may include more than one classifier 10. In FIG. 6, a first classifier is shown at 10A. The feed preparation circuit 4 includes a first cyclone C1 upstream of the first classifier 10A, a screen S upstream of the first cyclone C1, and a second cyclone C2 upstream of the screen S. Depending on the embodiment, the screen S may comprise two screens. For example, a first screen S1 may be provided, having a first fine particle outlet upstream of the first cyclone C1, and a first coarse particle outlet separate from the first fine particle outlet. A second screen S2 may also be provided further upstream, that is, with a second fine particle outlet of the second screen S2 upstream of the first screen S1, and a second coarse particle outlet separate from the second fine particle outlet. The first and second coarse particle outlets may either be routed for rejection or for beneficiation. In the depicted embodiment, a second classifier 10B is provided downstream of the first coarse particle outlet of the first screen S1.

Figure 7:
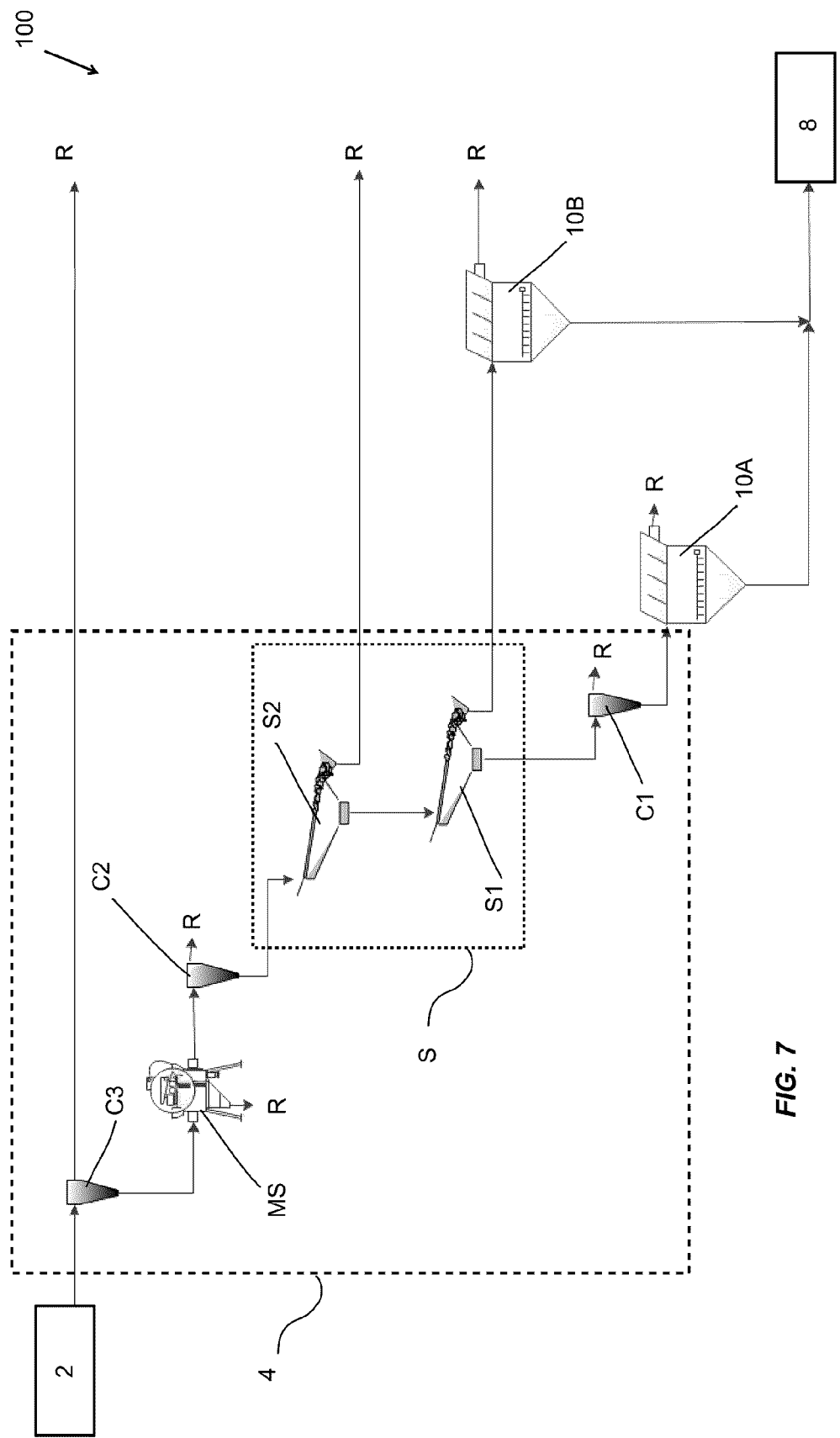

With reference to FIG. 7, the system 100 may include other particle separation devices, namely in the feed preparation circuit 4. In embodiments, more than two cyclones C may be provided. For example, a third cyclone C3 may be provided, having an overflow routed for rejection and an underflow separated therefrom may report to the second cyclone C2, whether directly or not. In some embodiments, an additional particle separation device may be provided between the third C3 and second C2 cyclones, for example a magnetic separator MS provided for separating particles based on their magnetic properties. In some such embodiments, the magnetic separator MS may be of a high-intensity type configured for targeting fine particles of paramagnetic ore minerals, such as hematite among others. The magnetic separator MS may thus separate a flow reporting thereto from upstream into downstream flows including a nonmagnetic flow to be routed for rejection and a magnetic concentrate to report further downstream toward the classifier 10.

Figure 8:
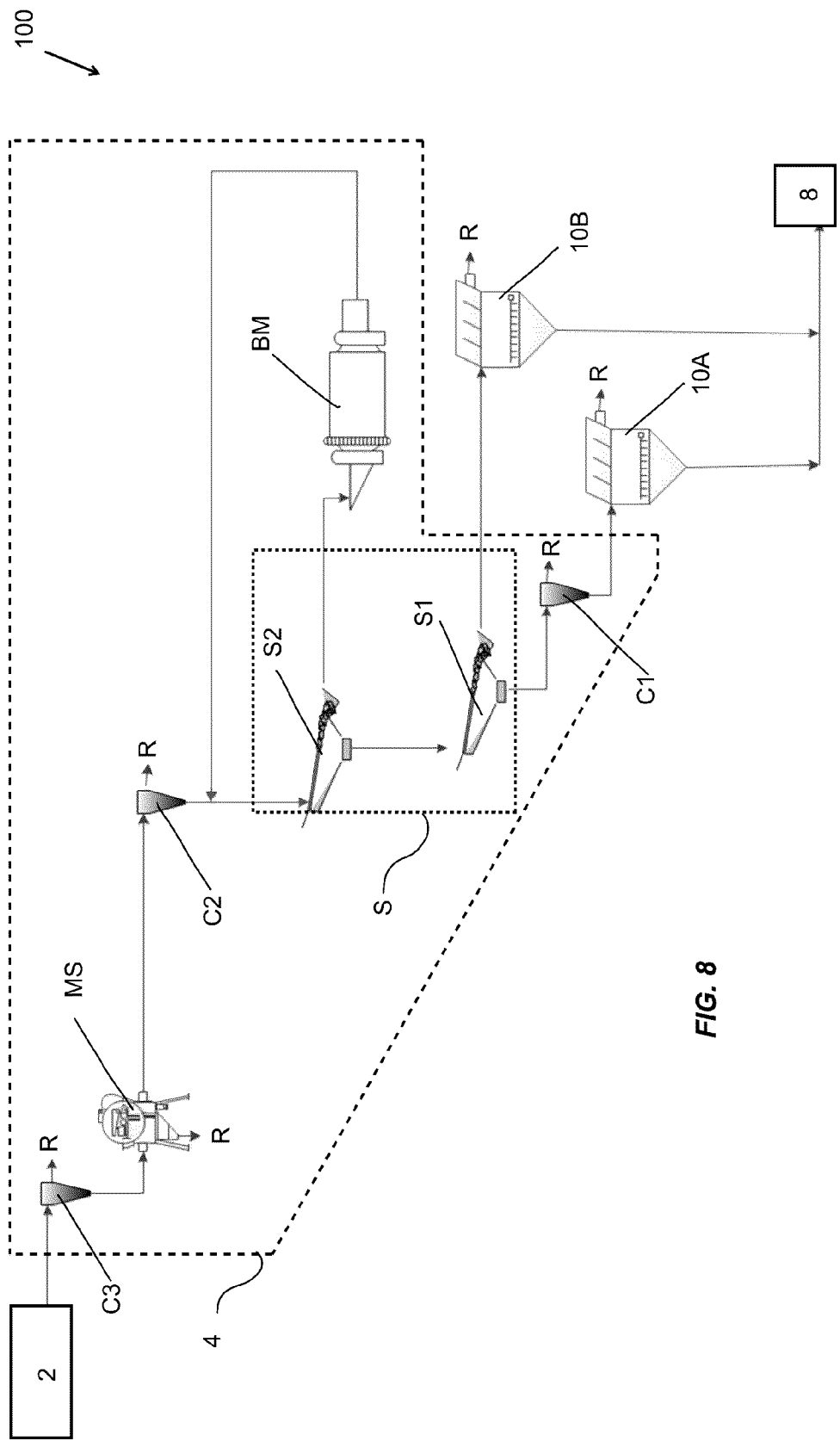

Referring to FIG. 8, it may be appreciated that the system 100 may, in some embodiments, include additional devices provided for further processing ore-containing substances otherwise routed for rejection. Such substances may for instance be obtained from an outlet of a given particle separation device, processed, and routed back to upstream of the given particle separation device. In some such embodiments, the feed preparation circuit 4 includes a ball mill BM having an input toward which substances from the coarse particle outlet of a given screen S of the system 100 are routed, and an output from which the processed substances are routed to upstream of the given screen S. The ball mill may be of a type suitable to reduce particles down to fine size fractions, which may desirably assist in breaking down fine particles of a size otherwise screened out via the given screen S so as to detach fine, high-density particles from lower-density particles.

Method of Classifying Fluid-Borne Particles

According to another aspect of the present technology, there is also provided a method of classifying particles of a feed of particles. The method may also be described as a method for increasing a concentration of high-density particles in a substance containing such particles via a fluid-borne particle classification device such as the classifier 10 operated as described hereinabove.

In embodiments, the method generally comprises flowing the feed containing high-density particles and low-density particles into the classifier 10. The method also comprises flowing a fluidization fluid into the classifier 10 to mix the fluidization fluid with the feed into a fluidized substance. The method also comprises flowing an overflow of the fluidized substance from inside the classifier 10 to outside thereof, the overflow containing more low-density particles than high-density particles such that a relative density value of a remainder of the fluidized substance inside the classifier 10 increases. The method also comprises sensing the relative density value of the fluidized substance inside the classifier 10, and, upon the relative density attaining a threshold value indicative of the fluidized substance having a grade of the high-density particles of at least 50% and preferably at least 60%, flowing an underflow of the fluidized substance from inside the classifier 10 to outside thereof.

In some embodiments, the feed has a grade of the high-density particles of between 20% and 43%.

In some embodiments, the method further comprises flowing a substance to a hindered settler HS, the substance having a grade of the high-density particles that is less than that of the feed, and splitting the substance into an overflow of particles and an underflow of particles, the overflow being a portion of the substance split from the underflow so as to include a dry weight of the high-density particles corresponding to at least 45% of that included by the substance. In some such embodiments, the dry weight of the underflow of the hindered settler HS may correspond to at least 50%, and more preferably between 55% and 75% of that included by the substance.

In some embodiments, the method further comprises obtaining the feed having a density lesser than 40%, which may include adding a fluid to the feed and controlling a solid feed rate so as to increase the density to at least 40%. In some such embodiments, the density is preferably increased to between 40% and 55%.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

Annex 1

TABLE 1

Total iron and silica distribution throughout the size fractions

| Size Fractions (Mesh) | Size Fractions (μm) | Grade of FeT particles (%) | Grade of SiO$_2$ particles (%) |
|---|---|---|---|
| +50 | +300 | 1.9 | 6.2 |
| −50 + 70 | −300 + 212 | 4.6 | 12.3 |
| −70 + 100 | −212 + 150 | 12.5 | 22.1 |
| −100 + 140 | −150 + 106 | 22.7 | 25.0 |
| −140 + 200 | −106 + 75 | 18.8 | 14.0 |
| −200 + 325 | −75 + 45 | 19.4 | 10.7 |
| −325 + 400 | −45 + 38 | 3.5 | 1.6 |
| −400 + 550 | −38 + 25 | 4.8 | 2.1 |
| −550 | −25 | 11.8 | 6.0 |

TABLE 2

Exemplary parameter values for operating the classifier 10

| Relative Density (kg/m3) | | Water Fluidization (USGPM) | | Solids Feed Rate (tph) | | HS Split (%) | |
|---|---|---|---|---|---|---|---|
| Min | Max | Min | Max | Min | Max | Min | Max |
| 2183 | 2423 | 59.7 | 80.4 | 31.2 | 43.8 | 57 | 72 |

The invention claimed is:

1. An iron ore particle classification system comprising: a classifier including: a vat defining an interior cavity, a feeder conduit upstream of the interior cavity, an overflow conduit in fluid communication between a top of the interior cavity and outside the vat, an underflow conduit downstream of the interior cavity, an underflow valve fluidly connected to a bottom of the interior cavity, the underflow valve controlled to be either in an open configuration in which the interior cavity is in fluid communication with the underflow conduit or in a closed configuration in which the interior cavity is sealed from the underflow conduit, and a controller operatively connected to probes arranged for measuring a differential pressure inside the interior cavity, the controller configured to calculate a relative density value based on the differential pressure measured by the probes, the controller operatively connected to the underflow valve and arranged to configure open the underflow valve into the open configuration upon the relative density attaining a threshold value so as to obtain an underflow having a desired iron ore grade;

a feed preparation circuit upstream of the feeder conduit;

a rejection circuit downstream of the overflow conduit, and a beneficiation circuit downstream of the underflow conduit configured to beneficiate the underflow of the classifier.

2. The system of claim 1, wherein the feed preparation circuit includes a plurality of separation devices, each one of the plurality of separation devices having a preparation outlet serially arranged upstream of the classifier and a rejection outlet routed away from the classifier.

3. The system of claim 2, wherein the plurality of separation devices includes a hindered settler having an overflow outlet upstream of the classifier and an underflow outlet routed away from the classifier.

4. The system of claim 3, wherein the plurality of separation devices further includes a cyclone downstream of the overflow outlet of the hindered settler, the cyclone having an underflow outlet upstream of the classifier.

5. The system of claim 2, wherein the plurality of separation devices includes a screen having a fine particle outlet upstream of the classifier.

6. The system of claim 5, wherein the classifier is a first classifier, the system further comprising a second classifier, the screen having a coarse particle outlet separate from the fine particle outlet and upstream of the second classifier.

7. The system of claim 6, wherein the screen includes a first screen and a second screen, the fine particle outlet upstream of the first classifier being a first fine particle outlet of the first screen, the coarse particle outlet upstream of the second classifier being a first coarse particle outlet of the first screen, the second screen having a second fine particle outlet upstream of the first screen.

8. The system of claim 7, wherein the feed preparation circuit includes a mill having an input and an output, the second screen having a second coarse particle outlet separate from the second fine particle outlet and routed to the input of the mill, the output of the mill routed to upstream of the second screen.

9. The system of claim 5, wherein the plurality of separation devices includes a magnetic separator upstream of the screen.

10. The system of claim 9, wherein the plurality of separation devices includes a first cyclone downstream of the screen, a second cyclone between the magnetic separator and the screen, and a third cyclone upstream of the magnetic separator.

11. A method of classifying fluid-borne particles for the beneficiation of iron ore particles, the method comprising:

obtaining a feed containing high-density particles and low-density particles, the high-density particles including iron ore particles;

fluidizing the feed into a fluidized substance;

rejecting an overflow from the fluidized substance, the overflow having a concentration of the low-density particles greater than that of a remainder of the fluidized substance;

sensing a relative density value of the fluidized substance; and beneficiating an underflow taken from the fluidized substance upon the sensed relative density value being indicative of the fluidized substance having a grade of the iron ore particles corresponding to a threshold value, including controlling the grade of the iron ore particles obtained at an outlet of the underflow as a function of the relative density value.

12. The method of claim 11, further comprising splitting a substance having a grade of the high-density particles lesser than that of the feed into a split overflow and a settled underflow according to a split value of at least 50%, the feed obtained from the split overflow.

13. The method of claim 11, wherein the feed has a grade of the high-density particles of at least 20%.

14. The method of claim 11, wherein obtaining the feed includes flowing the feed at a feed rate of between 10 tph to 200 tph.

15. The method of claim 11, wherein the feed has a feed density of between 30% and 55%.

16. The method of claim 15, further comprising increasing the feed density to at least 40%.

17. The method of claim 11, wherein fluidizing the substance includes flowing a fluidization fluid at a fluidization flow rate of between 10 USGPM and 200 USGPM.

18. The method of claim 11, wherein the threshold value corresponds to the sensed relative density being of between 1800 kg/m$^3$ and 3000 kg/m$^3$.

19. The method of claim 11, wherein the threshold value is of at least 60%.

20. The method of claim 11, wherein a dry weight of the high-density particles of the underflow corresponds to at least 50% of a dry weight of the high-density particles of the feed.

21. The system of claim 1, further comprising:

a casing for the vat, the casing defining a mixing chamber; and a bed formed as a media of particles densified along a horizontal layer of the mixing chamber;

wherein the relative density value is a ratio of the density of the media of the particles forming the bed and that of the media of particles located across the mixing chamber.

* * * * *